(12) United States Patent
Schmidt et al.

(10) Patent No.: US 11,015,628 B2
(45) Date of Patent: May 25, 2021

(54) CONNECTING ELEMENT FOR PRODUCING A CONNECTION BETWEEN A HOLLOW PROFILED ELEMENT AND A FURTHER COMPONENT

(71) Applicant: Linde + Wiemann SE & Co. KG, Dillenburg (DE)

(72) Inventors: Werner Schmidt, Alzenau (DE); Marcel Georg, Dillenburg (DE); Michael Solbach, Wenden (DE)

(73) Assignee: Linde + Wiemann SE & Co. KG, Dillenburg (DE)

( * ) Notice: Subject to any disclaimer, the term of this patent is extended or adjusted under 35 U.S.C. 154(b) by 366 days.

(21) Appl. No.: 16/321,066

(22) PCT Filed: Aug. 22, 2017

(86) PCT No.: PCT/EP2017/071125
§ 371 (c)(1),
(2) Date: Jan. 28, 2019

(87) PCT Pub. No.: WO2018/037004
PCT Pub. Date: Mar. 1, 2018

(65) Prior Publication Data
US 2019/0178277 A1   Jun. 13, 2019

(30) Foreign Application Priority Data

Aug. 24, 2016  (DE) .......................... 102016115717.1

(51) Int. Cl.
*F16B 7/18*   (2006.01)
*F16B 7/20*   (2006.01)

(52) U.S. Cl.
CPC ................ *F16B 7/185* (2013.01); *F16B 7/20* (2013.01)

(58) Field of Classification Search
CPC .......... F16B 7/187; F16B 7/0476; F16B 7/20; F16B 7/044; F16B 7/025; F16B 7/0446; F16B 37/045; F16B 37/046; F16B 37/047
See application file for complete search history.

(56) References Cited

U.S. PATENT DOCUMENTS 4,133,560 A  *  1/1979  Ishikawa ............... F16L 41/084
                                                   220/293
4,220,808 A  *  9/1980  Fujita .................... H02B 1/048
                                                   174/490

(Continued)

FOREIGN PATENT DOCUMENTS

CN   103827408 A    5/2014
DE    4341206 A1    6/1995
(Continued)

*Primary Examiner* — Daniel J Wiley
(74) *Attorney, Agent, or Firm* — Rogowski Law LLC

(57) ABSTRACT

The invention relates to a connecting element (1) for producing a connection between a hollow profiled element (16) and a further component (17), wherein the connecting element (1) is designed for at least interlockingly engaging with the hollow profiled element (16) and for connecting to the further component (17). According to the invention, at least two contact surfaces (2, 3), which are arranged at an offset to each other in height, are provided on the connecting element (1) for contact with at least two sections (18, 19) of the hollow profiled element (16) that correspond to said contact surface.

16 Claims, 6 Drawing Sheets

Fig.4

(56) References Cited

U.S. PATENT DOCUMENTS

| | | | | |
|---|---|---|---|---|
| 4,515,496 A * | 5/1985 | McKay | .................. | F16B 7/044 403/388 |
| 4,756,638 A * | 7/1988 | Neyret | .................. | E05B 9/084 403/261 |
| 5,567,005 A | 10/1996 | Pietzsch | | |
| 5,904,420 A * | 5/1999 | Dedoes | ............ | B01F 15/00454 366/198 |
| 6,942,255 B2 * | 9/2005 | Pickering | ............. | F16L 37/252 285/136.1 |
| 8,444,100 B2 * | 5/2013 | Takahashi | ........... | F16B 19/1081 248/222.52 |
| 9,795,076 B2 * | 10/2017 | Lind | ....... | F16L 41/14 |
| 2004/0079935 A1 * | 4/2004 | Brucker | ................ | E04H 17/163 256/59 |
| 2004/0109724 A1 * | 6/2004 | Tiemann | ................ | F16B 21/04 403/349 |
| 2004/0208728 A1 * | 10/2004 | Fattori | ................. | F16B 21/082 411/508 |
| 2009/0272957 A1 * | 11/2009 | Nelson | ............... | E04F 11/1817 256/65.01 |
| 2014/0241274 A1 | 8/2014 | Sim Boon Keng | | |
| 2014/0241794 A1 | 8/2014 | Sim | | |
| 2016/0107692 A1 | 4/2016 | Carle | | |
| 2016/0160525 A1 * | 6/2016 | Milanowski | ........ | E04F 11/1842 256/65.12 |
| 2017/0216189 A1 | 8/2017 | Dorr | | |

FOREIGN PATENT DOCUMENTS

| | | |
|---|---|---|
| DE | 10306180 A1 | 9/2004 |
| DE | 202013105256 U | 12/2013 |
| DE | 202013105256 U1 | 1/2014 |
| DE | 102013008913 A1 | 11/2014 |
| DE | 102015000490 A1 | 7/2016 |
| EP | 0841240 A2 | 5/1998 |
| EP | 1380495 A1 | 1/2004 |
| FR | 2689945 A1 | 10/1993 |
| GB | 2109433 A | 6/1983 |
| JP | H02122875 U | 10/1990 |
| WO | 2013055292 A1 | 4/2014 |
| WO | 2015022389 A1 | 2/2015 |
| WO | 2015075281 A1 | 5/2015 |

* cited by examiner

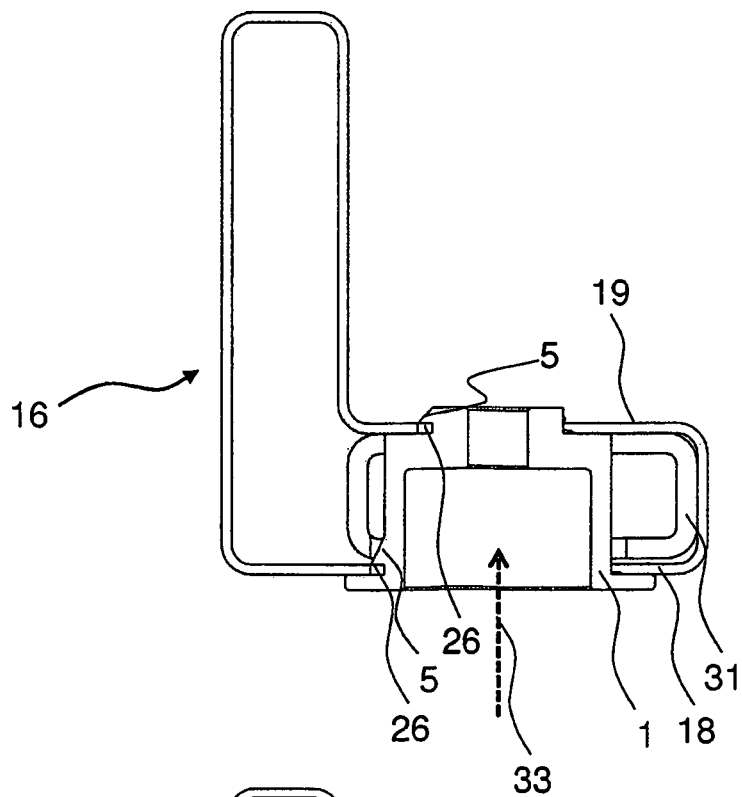
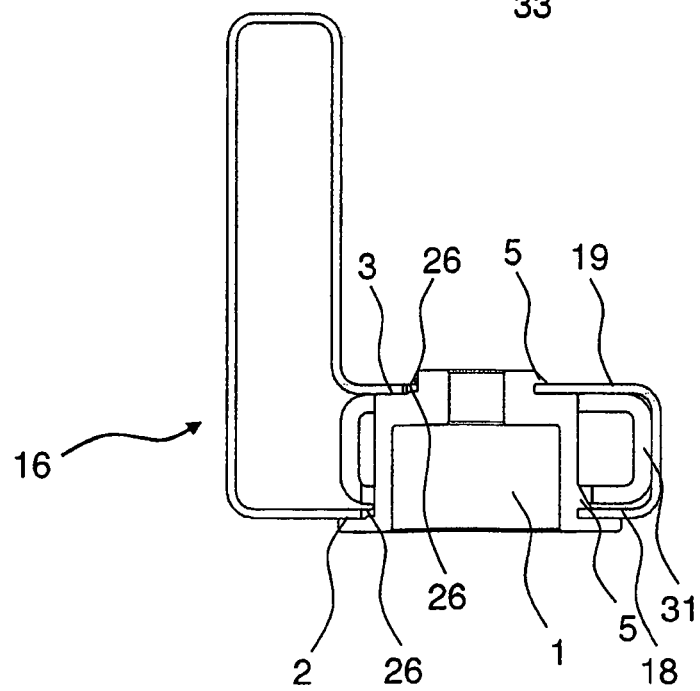

CONNECTING ELEMENT FOR PRODUCING A CONNECTION BETWEEN A HOLLOW PROFILED ELEMENT AND A FURTHER COMPONENT

CROSS-REFERENCE TO RELATED APPLICATIONS

This application is a national stage application (under 35 USC § 371) of PCT/EP2017/071125, filed Aug. 22, 2017, which claims benefit of German application No. 10 2016 115 717.1, filed Aug. 24, 2016, the contents of each of which are incorporated by reference herein.

BACKGROUND OF THE INVENTION

Technical Field and State of the Art

The invention relates to a connecting element for establishing a connection between a hollow profile and another component, whereby the connecting element is configured, on the one hand, to engage with the hollow profile by means of an at least positive fit and also to connect to the other component. Moreover, the present invention relates to a hollow profile having at least one connecting cutout and it also relates to a hollow profile connection.

When hollow profile components, especially roll-formed hollow profile components, are installed, there is generally a need to pay attention to the fact that the geometric arrangement of the profile walls changes because of the holding forces that occur during the installation. In particular, the walls of the hollow profile that impart the stability should not be impermissibly moved relative to each other since this could negatively affect the mechanical stability of the hollow profile. In automotive construction, such hollow profiles are used to build motor vehicle components, for example, for constructing battery boxes in electric vehicles. Here, the battery boxes made of the hollow profiles are subject to high requirements in terms of their mechanical stability and resistance to crash conditions. At the same time, it is necessary to ensure a permanent and reliable connection to another component, for example, to a vehicle body sill.

In order to ensure that the holding forces are introduced into the hollow profile as uniformly as possible, stable inserts are often inserted into the hollow profile component, also so that fastening means such as screws can be securely anchored on the hollow profile.

European patent application EP 0 841 240 A2 discloses a hollow profile in which a bushing for a screwed connection is inserted into an opening of the profile, whereby on the one hand, the bushing is pressed into a partition wall of the profile and, on the other hand, to an outer delimitation wall of the hollow profile. For one thing, such a configuration requires two separate joining steps to fasten the bushing to the hollow profile. Secondly, pressing the bushing into the partition wall of the hollow profile requires a fit with a narrow tolerance between the outer surface of the bushing and the corresponding opening, as a result of which the production of the hollow profile connection becomes more expensive. Moreover, the pressing step can lead to an undesired deformation of the partition wall of the hollow profile.

British patent application GB 2 109 433 A describes a bushing for a profile screwed connection that is inserted into a through hole of the hollow profile in the manner of a wall plug and it is then widened by a stud in such a way that the bushing is surrounded with a positive fit inside the hollow profile.

U.S. Pat. No. 5,567,005 A discloses a fastening sleeve that is used as a connecting means for creating screwed connections with a car body frame and that has to be welded to the car body frame in several places.

German patent application DE 43 41 206 A1 discloses a hollow profile with a connecting element that is held with a positive fit inside the hollow profile, thereby forming a bead.

French patent application FR 2 689 945 A1 discloses a two-part screw sleeve for connecting several profile sections.

German patent application DE 10 2013 008 913 A1 discloses a multi-chamber profile with an insertion part for fastening an add-on part, whereby the cross section of the insertion part corresponds approximately to the profile cross section of the multi-chamber profile. The insertion part has to be inserted into the hollow profile with great effort through an open end face of the profile and then slid to the appropriate screwing position before a screwed connection of the profile with the add-on part is possible.

International patent application WO 2015/022389 A1 discloses a housing to accommodate objects, said housing having a screwed fastening that has a spacer arranged between two plates of the housing.

International patent application WO 2015/075281 A1 discloses a connecting area for connecting an add-on part to a car body, whereby a connecting element is inserted into the hollow profile and joined to a support part of the car body by means of resistance pressure welding. In a second, separate fastening section, which is arranged at a distance from the first fastening section, the connecting element is connected to a reinforcement plate of the car body.

European patent application EP 1 380 495 A1 discloses a car body hollow support with a threaded insert part that can be inserted into the hollow profile support.

German patent application DE 103 06 180 A1 discloses a motor vehicle component and a method for its production out of a sheet metal profile, said component having at least one threaded connection.

Moreover, German utility model DE 20 2013 105 256 U1, international patent application WO 2015/022389 A1 as well as German patent application DE 10 2015 000 490 A1 are known from the state of the art.

The solutions known from the state of the art for connecting a hollow profile component to another component, especially a car body, have proven to be too expensive and too laborious.

SUMMARY OF THE INVENTION

Before this backdrop, the invention is based on the objective of a connecting element that can be connected to the hollow profile in a simple manner and which, at the same time, can transmit a high holding force to the hollow profile.

A connecting element for establishing a connection between a hollow profile and another component is configured, on the one hand, to engage with the hollow profile by means of an at least positive fit and, on the other hand, to be connected to the other component, and it is characterized in that at least two contact surfaces whose heights are arranged offset relative to each other are provided to establish contact with at least two corresponding sections of the hollow profile, whereby the connecting element has a rotation-symmetrical base and at least a positive-fit means is provided that wraps around the hollow profile when it is in the connected position in order to affix the connecting element to a section of the hollow profile by means of the bayonet principle. Owing to such a configuration, the assembly is facilitated, specifically in the case of serial production. At the same time, the transmission of the high holding forces is ensured.

In one embodiment of the connecting element, at least two contact surfaces whose heights are arranged offset relative to each other are provided on the connecting element for establishing contact with at least two corresponding sections of the hollow profile.

The basic notion of the invention is to insert the connecting element into the hollow profile component in a simple manner and consequently, to then be able to introduce high holding forces into the hollow profile component via the contact surfaces, whereby at the same time, the geometry of the hollow profile component is hardly or not at all changed with respect to the envisaged profile geometry. Here, the contact surfaces are arranged on the connecting element approximately equidirectionally in such a way that the latter comes to rest with its two contact surfaces on different sections of the hollow profile, as a result of which a holding force acting on the connecting element is introduced into the hollow profile via the one contact surface as well as via the other contact surface. For example, the contact surfaces of opposing walls of a hollow profile come into contact, as a result of which the force is introduced over a larger surface area. The connecting element is thus essentially configured to transmit the holding force to the hollow profile in one direction via both contact surfaces.

According to a preferred embodiment, it can be provided for the contact surfaces to run in planes that are configured approximately parallel to each other. In this manner, the holding forces that are to be introduced into the hollow profile can be transmitted very well and uniformly and, at the same time, the dimensional stability of the profile geometry can be retained.

Moreover, it can be provided for the connecting element to have a positive-fit means, especially a latching hook, that wraps around the hollow profile in the connecting position, in order to affix the connecting element to a section of the hollow profile. The one or more positive-fit means allow the connecting element to be installed especially easily onto the hollow profile component, whereby the connecting element is already securely connected to the hollow profile without an additional joining step. The positive-fit means are provided primarily to affix the connecting element in the hollow profile. Consequently, the positive-fit means can be configured to transmit considerably lower forces in comparison to the forces transmitted by the contact surfaces of the connecting element.

In particular, the connecting element is attached to the hollow profile according to the so-called "bayonet principle" in that the connecting element can be inserted approximately rectilinearly into a connecting cutout of the hollow profile and can then be affixed there by simply rotating the connecting element relative to the hollow profile component.

Such a connecting concept, which is based on simple movements of the connecting element and of the hollow profile relative to each other, is especially well-suited for automated mass production.

Moreover, in a special embodiment, it can be provided that each contact surface is associated with at least one positive-fit means for establishing a positive-fit connection with the corresponding section of the hollow profile. In this manner, a particularly secure connection can be established between the connecting element and the hollow profile component.

It can preferably be provided for the at least one positive-fit means to have insertion aids, especially insertion bevels, on one side facing away from the appertaining contact surface. This has the special advantage that mechanical installation or blind installation can be carried out faster and more easily.

In a preferred embodiment, the connecting element can also have at least one latching means, especially at least one detent, on at least one of the contact surfaces in order to ensure the connection to the hollow profile. Especially when the hollow profile is used in applications that are greatly stressed by vibrations, such as on a car body, this can successfully counter an undesired self-loosening of the hollow profile.

Moreover, according to a preferred embodiment, it can be provided that, on at least one of the contact surfaces, sealing means to create a sealing contact are provided on a section of the hollow profile, whereby the sealing means are preferably arranged on a circumferential sealing track. In this manner, the hollow profile or the hollow profile connection created together with the connecting element can be sealed easily and in one step, thus preventing the penetration of foreign matter or the penetration of moisture. Especially when hollow profile components are used in automotive construction, particularly in an application of the tubular profile component as a frame of a battery box, sealing against moisture penetration is very important.

Moreover, in a preferred embodiment, it can be provided that means for the placement of a tool, especially a key placement surface, are provided on the connecting element. The provision of means for the placement of a tool allows a significant simplification of the installation process since a relative movement can easily be transmitted in order to establish a connection between the connecting element and the hollow profile.

In particular, it can be provided that the means are provided for the placement of a tool on a section of the connecting element that connects the contact surfaces, especially on a circumferential section. This section, especially the circumferential section, which is provided on the connecting element mainly for spacing the contact surfaces, can thus be provided for a further use so that, in spite of an expanded functionality, the connecting element is hardly or not at all larger or more difficult to manufacture.

The objective of the invention is also achieved by a hollow profile according to claim 11, which has a connecting cutout that passes through at least two wall sections of the hollow profile that are opposite from each other, each having at least one recess to accommodate a connecting element, whereby the recesses have a different size, especially a different diameter, and said cutout is characterized in that, in order to establish a connection between the hollow profile and a connecting element, at least one recess of the hollow profile has at least one radial widened area so that at least one positive-fit means of the connecting element can be passed through.

Such a configuration of the hollow profile allows a particularly simple connection of a connecting element to the hollow profile, along with a transmission of holding forces over a large surface area in order to attach the hollow profile to another component.

The objective is also achieved by a hollow profile connection according to claim 12, having at least one connecting element according to the invention and a hollow profile, especially the hollow profile according to the invention.

In this context, it can be especially provided that, when the connecting element is in its installed state, its contact surfaces are in contact with corresponding sections of the hollow profile, whereby positive-fit means of the connecting element wrap around at least one of the sections, so that part of the section comes to lie between the positive-fit means and the contact surface.

In this manner, the connecting element can be affixed especially easily to the hollow profile and, at the same time, it can transmit the requisite holding force to the hollow profile. The connecting element itself can be attached, especially screwed, to another component.

In a preferred embodiment, it can be provided that, when the connecting element is in its installed state, it is additionally secured against rotating in the plane of one of the contact surfaces, preferably with a positive and/or frictional fit, especially with a positive and/or frictional fit, along with an integrally bonded connection.

In very highly stressed applications of the hollow profile connection, the quality of the hollow profile connection can be improved by providing an additional securing means against autonomous rotation in the plane of at least one of the contact surfaces.

In order to achieve a permanently captive connection between the connecting element and the hollow profile, in addition to a positive-fit and/or a frictional-fit resistance, an integrally bonded connection can be added between the hollow profile and the connecting element, at least in certain sections. Preferably, this integrally bonded connection is achieved by means of welding. Soldering or gluing the connecting element to the hollow profile component, however, likewise falls within the scope of the invention.

Presentation of the Invention

Additional objectives, advantages, features and application possibilities of the present invention can be gleaned from the description below of embodiments making reference to the drawing. In this context, all of the described and/or depicted features, either on their own or in any meaningful combination, constitute the subject matter of the present invention, also irrespective of their compilation in the claims or in the claims to which they refer back.

DETAILED DESCRIPTION

Figure 1:
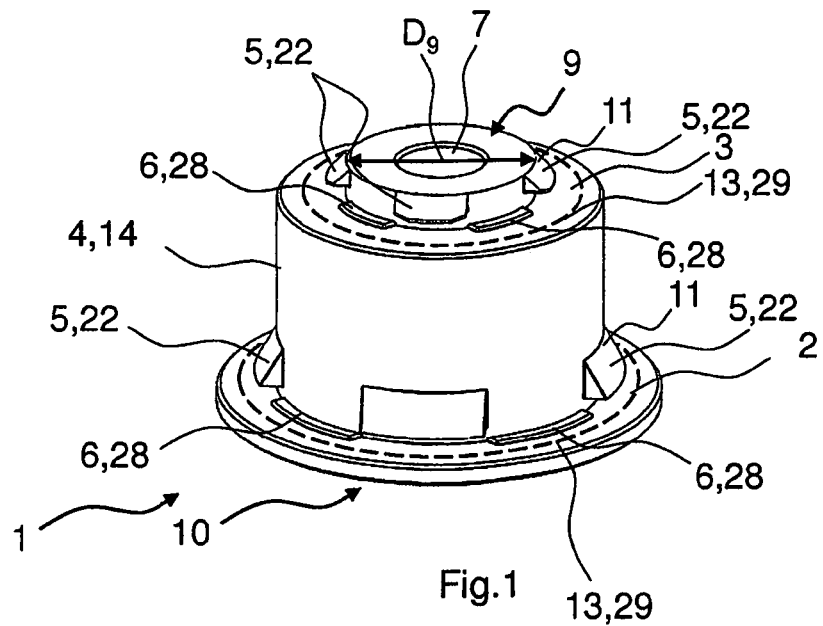
FIG. 1 a schematic perspective view of a connecting element according to the invention, FIG. 2 a schematic sectional view of the connecting element according to the invention, FIG. 3 a bottom view of a connecting element according to the invention, FIG. 4 a schematic side sectional view of a hollow profile component with an inserted connecting element, FIG. 5 a schematic perspective view of a hollow profile, FIG. 6 a perspective view of a hollow profile with several connecting elements, FIG. 7 a schematic perspective view of a hollow profile with connecting elements, FIG. 8 a schematic sectional view of a hollow profile with an inserted connecting element during installation, FIG. 9 a view according to FIG. 8, but after the completed installation of the connecting element, and FIG. 10 a hollow profile connection in the installed position on another component.

For the sake of clarity, identical components or those having the same effect are provided with the same reference numerals in the figures shown below, making reference to several embodiments.

Figure 2:
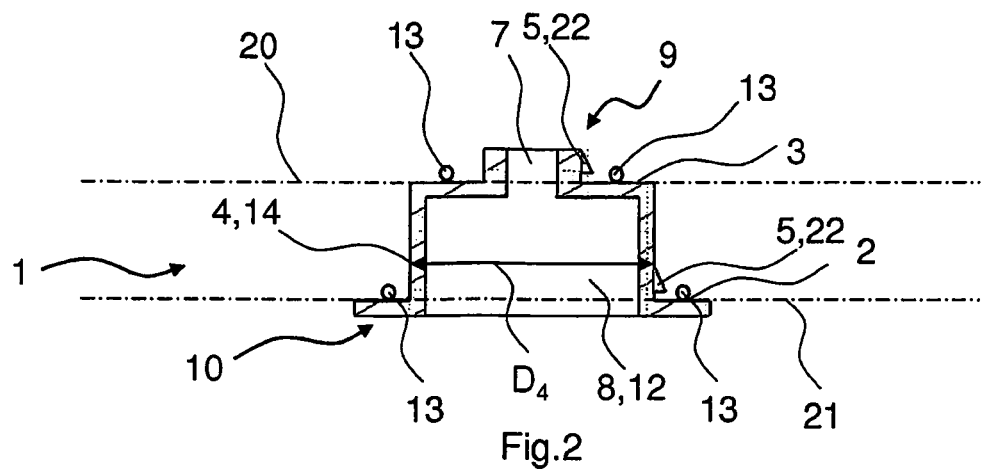
Figure 3:
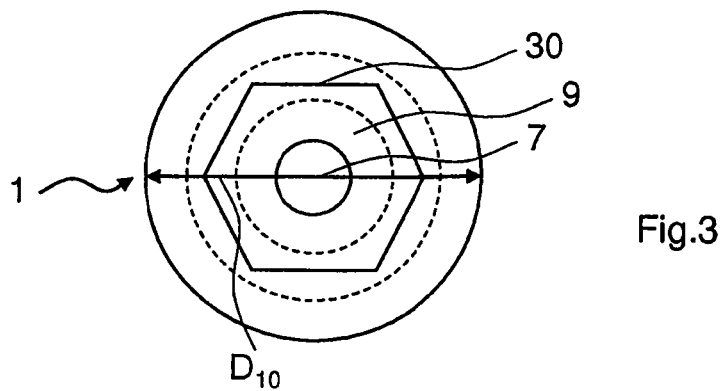

A connecting element 1 according to the invention is shown in FIGS. 1 to 3. FIG. 1 shows a perspective view of the connecting element 1 that, in the present embodiment, is configured as a so-called screw bushing or screw sleeve. The connecting element 1 fundamentally has an essentially rotation-symmetrical base with an approximately cylindrical head section 9 that is connected to an annular collar 10 via a section 4 that is cylindrically shaped, at least on the outside. The section 4 of the connecting element 1 is recessed in terms of its diameter $D_4$ vis-à-vis the diameter $D_{10}$ of the annular collar 10, thereby forming a first contact surface 2.

For purposes of describing the invention, the following definitions of directions are used: the direction "upwards" is the direction in which the head section 9 extends away from the section 4. The direction "downwards" is the direction in which the annular collar 10 extends away from the section 4. The circumferential direction is the direction in which, for example, the circumferential surface of the section 4 extends.

The head section 9 of the connecting element 1 is recessed in terms of its diameter $D_9$ vis-à-vis the diameter $D_4$ of the section 4, thereby forming a second contact surface 3.

The contact surfaces 2 and 3 thus have the same direction, in this case, upwards, and their heights are configured offset relative to each other. In this context, it is possible for the two contact surfaces 2 and 3 to extend in planes 20, 21 that run approximately parallel to each other. "Approximately parallel" means that the planes have to be seen as being parallel to each other within the shape and position tolerances associated with them. However, other embodiments are also conceivable in which the planes 20, 21 in which the contact surfaces 2, 3 run are not parallel to each other.

On each head section 9 and on each section 4 of the connecting element 1, there are positive-fit means 5 in the form of latching hooks 22 that project radially from the head section 9 or from the section 4 and that, at the same time, are at a distance upwards from the appertaining contact surfaces 2, 3. In the present embodiment, three positive-fit means 5 can be seen on the head section 9 and on the section 4, whereby a fourth positive-fit means 5 is provided on the rear of the connecting element 1, but it is concealed in this view. However, it is also possible for more or fewer positive-fit means 5 to be provided. In order to affix the connecting element 1, there is a need for at least one positive-fit means 5 that is arranged either on the section 4 or on the head section 9. When several positive-fit means 5 are provided, it is preferable for the positive-fit means 5 to be arranged so as to be uniformly distributed along the circumference.

Additional latching means 6 can be provided on the appertaining contact surfaces 2, 3. In the present embodiment, these latching means 6 are configured as detents 28. The latching means 6 are preferably arranged in the circumferential direction so as to be offset relative to the positive-fit means 5.

The connecting element 1 is configured in the head section 9 for the connection to another component 17. This other component 17 is shown, for example, in FIGS. 4 and 10, and it can be a vehicle body sill 34. In the present embodiment, the configuration of the head section 9 for the connection to another component 17 is achieved by providing a screw hole 7 that is preferably arranged concentrically with the head section 9 or with the section 4 and the collar 10.

Figure 10:
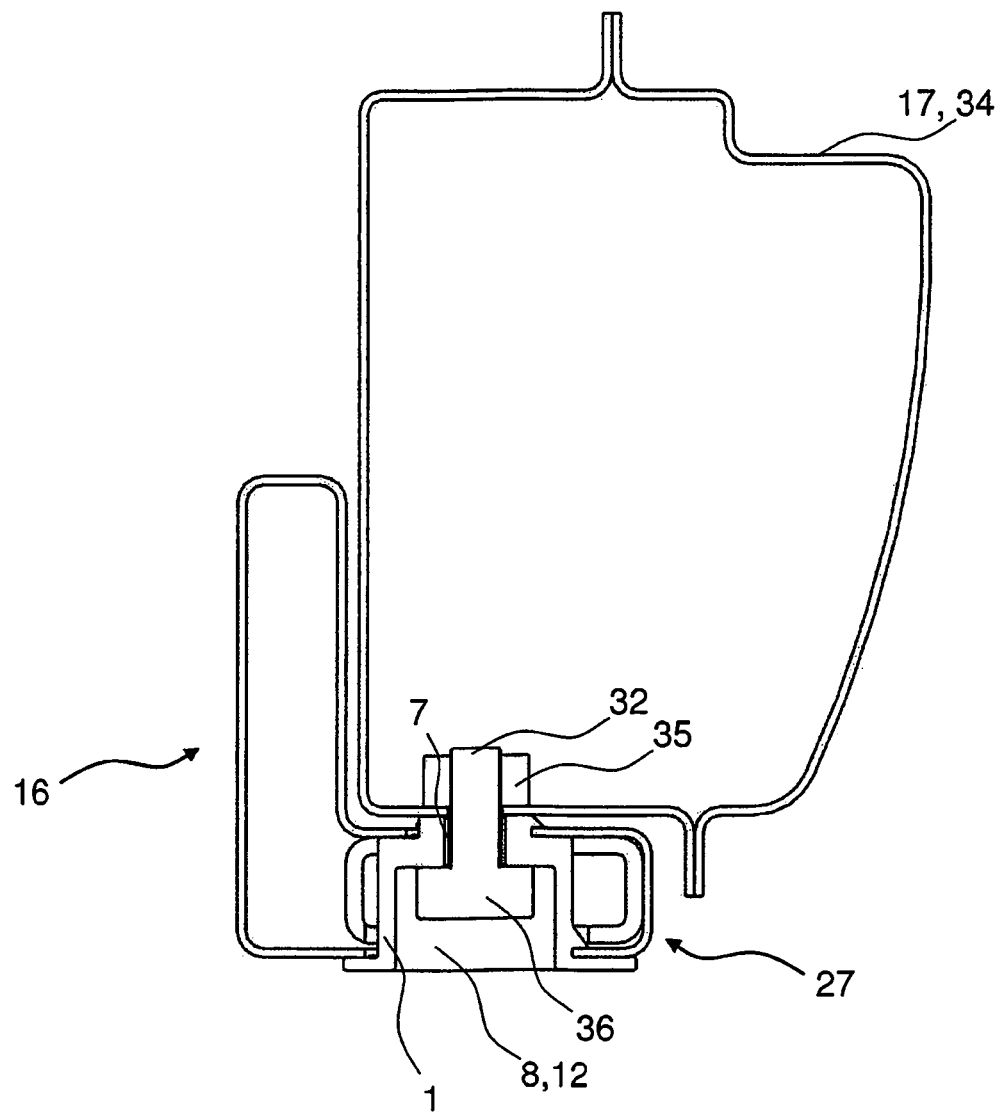

In the case of the concentric shape of the connecting element 1—aside from the positive-fit means 5 and the latching means 6—the section 4 forms a circumferential surface 14, at least on the outside, that surrounds a receiving space 8 shown in FIG. 2 for a fastening means such as, for example, a screw 32 shown in FIG. 10.

Deviating from the rotation-symmetrical circumferential surface of the circumferential section 14, it is also possible for the receiving space 8 for the fastening means not to be rotation-symmetrical in shape on the inside, so as to concurrently form a means 12 for the placement of a tool. The means 12 can thus also be referred to as a tool socket means. In the present embodiment, these means 12 are configured as a key surface 30, this forming, for example, part of an internal hexagon shape, as is shown in FIG. 3. The circumferential section 14 thus has a cylindrical circumferential surface and an internal surface with a hexagonal cross section.

Moreover, on the contact surfaces 2, 3 that form the tops of the collar 10 as well as of the section 4, a sealing means 13 can also be arranged or sunk in there, which can be configured as a sealing track 29 that runs along the circumferential direction. Here, it is conceivable for a sealing means 13, which also functions as an adhesive, to augment or replace the latching means 6 provided on the contact surfaces 2, 3. This also applies if the sealing means is not configured to be adhesive but rather to be compressible. Moreover, sealing means 13 can also be provided on just one of the contact surfaces 2, 3.

FIGS. 4 through 10 show a hollow profile 16 into which a connecting element 1 can be inserted or has been inserted.

When the connecting element 1 is in its installed state, it is held with a positive fit in the hollow profile 16. This is achieved in that the positive-fit means 5 configured as latching hooks 22 wrap around sections 18, 19 of the hollow profile 16 on which, in turn, the appertaining contact surfaces 2, 3 of the connecting element 1 rest.

A connecting cutout 23 is made in the hollow profile 16 in order to accommodate the connecting element 1 and the recesses 24, 25 of the connecting cutout 23 extend upwards and downwards in the hollow profile 16, thereby passing through the upper section 19 of the hollow profile 16 and the lower section 18 of the hollow profile 16. Here, the diameter $D_{24}$ of the recess 24 formed in this manner on the lower section 19 of the hollow profile 16 is configured at least so large that the circumferential section 14 of the connecting element 1—except for the positive-fit means 5 shaped thereupon—can be passed through. The diameter $D_{25}$ of the second recess 25 on the upper section 19 of the hollow profile 16 is configured in such a way that the head section 19—except for the positive-fit means 5 shaped thereupon—an be passed through.

In addition, radial widened areas 26, which correspond to the positive-fit means 5 arranged on the connecting element 1, are formed on the recesses 24, 25.

For the installation, the connecting element 1 is inserted in an insertion direction 33 through the larger recess 25 into the hollow profile, whereby the positive-fit means provided on the circumferential section 14 match the corresponding recesses 26. When the upper section 18 of the hollow profile 16 is reached, then the head section 9 is passed through the upper recess 25 of the hollow profile 16, whereby for this purpose, the positive-fit means 5 also have to be aligned with the corresponding radial widened areas 26.

The state in which the connecting element 1 is inserted into the hollow profile 16 is shown in FIG. 8 in which the positive-fit means 5 match the radial widened areas 26. In order to affix the connecting element 1 to the hollow profile 16, the connecting element 1 is then rotated in the circumferential direction so that the positive-fit means 5 no longer match the appertaining radial widened areas 26, in order to wrap around the corresponding section 18, 19 of the hollow profile 16, as shown in FIG. 9.

In order to facilitate the insertion of the connecting element 1 into the hollow profile 16, the positive-fit means 5 are at least partially provided with an insertion aid created, for example, in the form of insertion bevels 11 that extend on the side of the positive-fit means 5 facing away from the contact surfaces 2, 3. In one embodiment, the insertion bevels are to be provided, for instance, only on the positive-fit means 5 that are arranged on the section 4 of the connecting element. A centering and alignment of the connecting element 1 relative to the hollow profile 16 achieved by these insertion bevels can already be sufficient to allow the insertion of the head section 9 into the second recess 25 in the proper position. The opposite case is likewise possible in which only the positive-fit means 5 that are shaped onto the head section 9 have insertions aids in the form of insertion bevels 11.

At the same time, the connecting element 1 inserted into the hollow profile 16 can pass through a reinforcement element 31 that has been inserted into the hollow profile and can be partially in contact with an inner surface of the reinforcement element 31 in the area of the circumferential section 14. In this manner, the connecting element 1 can have the additional function of absorbing forces that stem from the reinforcement element 31 and that act in the direction of the circumferential section 14 and of introducing these forces into the hollow profile 16 via the lateral engagement of the head section 9 as well as of the circumferential section 14.

This applies, for example, in case of a crash, in which the reinforcement element 31 can be moved so as to be laterally deformed.

The present connecting element 1 can preferably be used in vehicle applications in which hollow profile components are made of the hollow profile 16 described here, and can be screwed to other components 17, for example, to a vehicle frame. Here, the hollow profile 16 is preferably pre-tensioned in the insertion direction 33 against the other component 17, whereby the contact surfaces 2, 3 introduce the occurring forces into the hollow profile along the insertion direction.

In such applications, there are regularly substantial vibration stresses that could cause the connection between the connecting element 1 and the hollow profile 16 to come loose of its own accord. Due to their contact with the appertaining section 18, 19 of the hollow profile, the latching means 6 provided on the connecting element 1 counter an undesired autonomous rotation of the connecting element 1 relative to the hollow profile 16.

Figure 4:
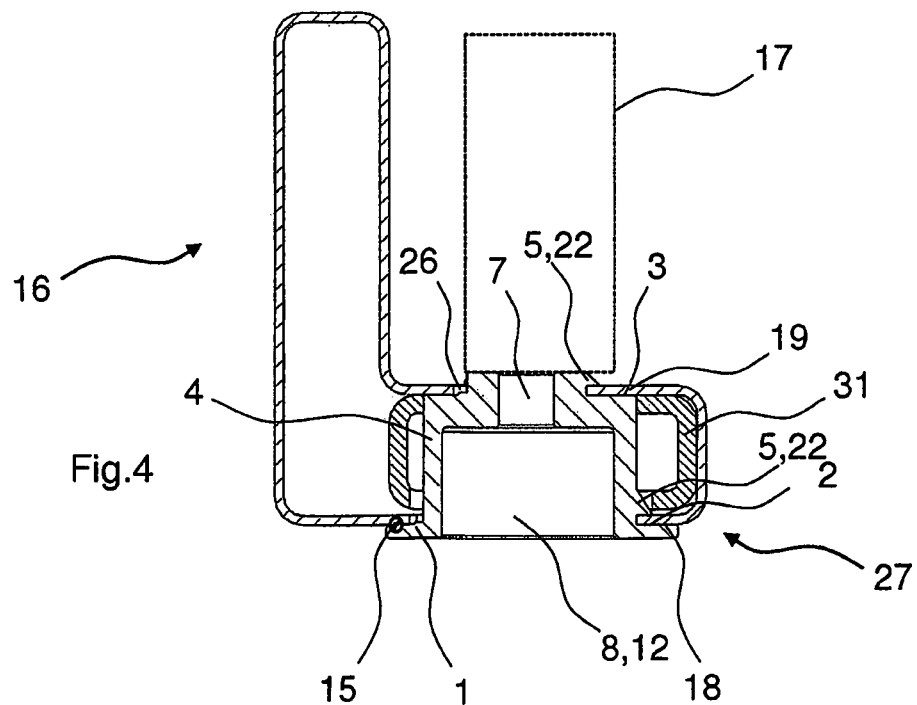
Figure 5:
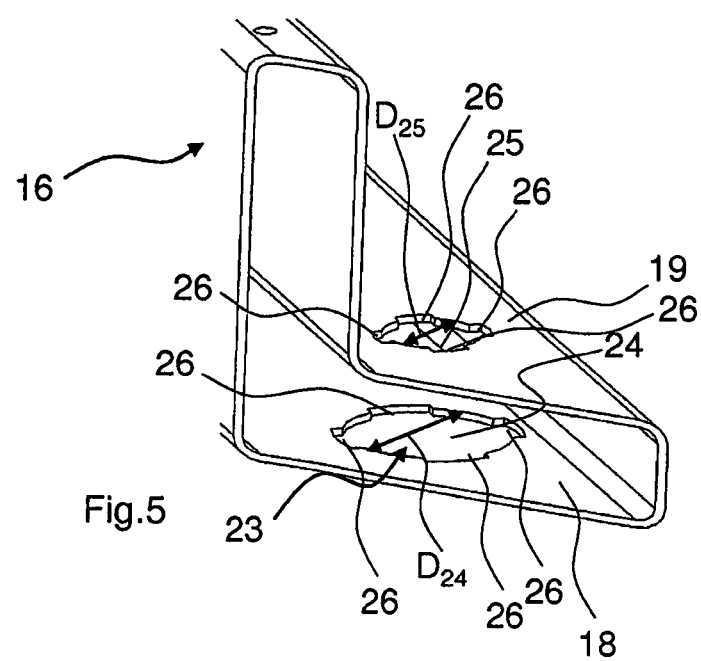

Moreover, a welded connection 15 can be provided that secures the connecting element 1—as is shown in FIG. 4—against rotation. Instead of the welded connection 15 and the latching means 6, however, other securing modalities with a positive fit and/or a frictional fit or with an integrally bonded connection are also conceivable in order to prevent autonomous rotation of the connecting element 1. For example, the connecting element can be additionally glued or soldered onto the hollow profile 16. It is likewise conceivable for the sealing means 13 to concurrently serve as frictional latching means 6 or as an adhesive connection.

Figure 6:
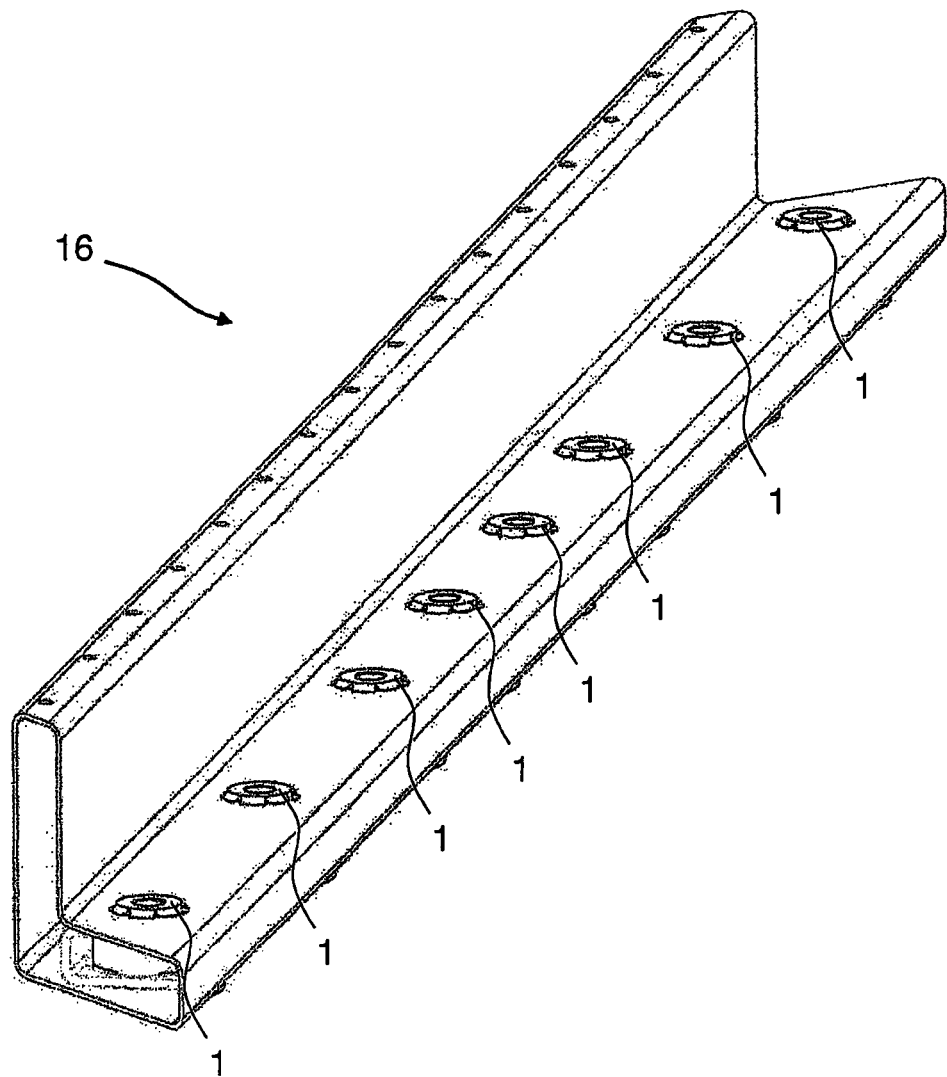
Figure 7:
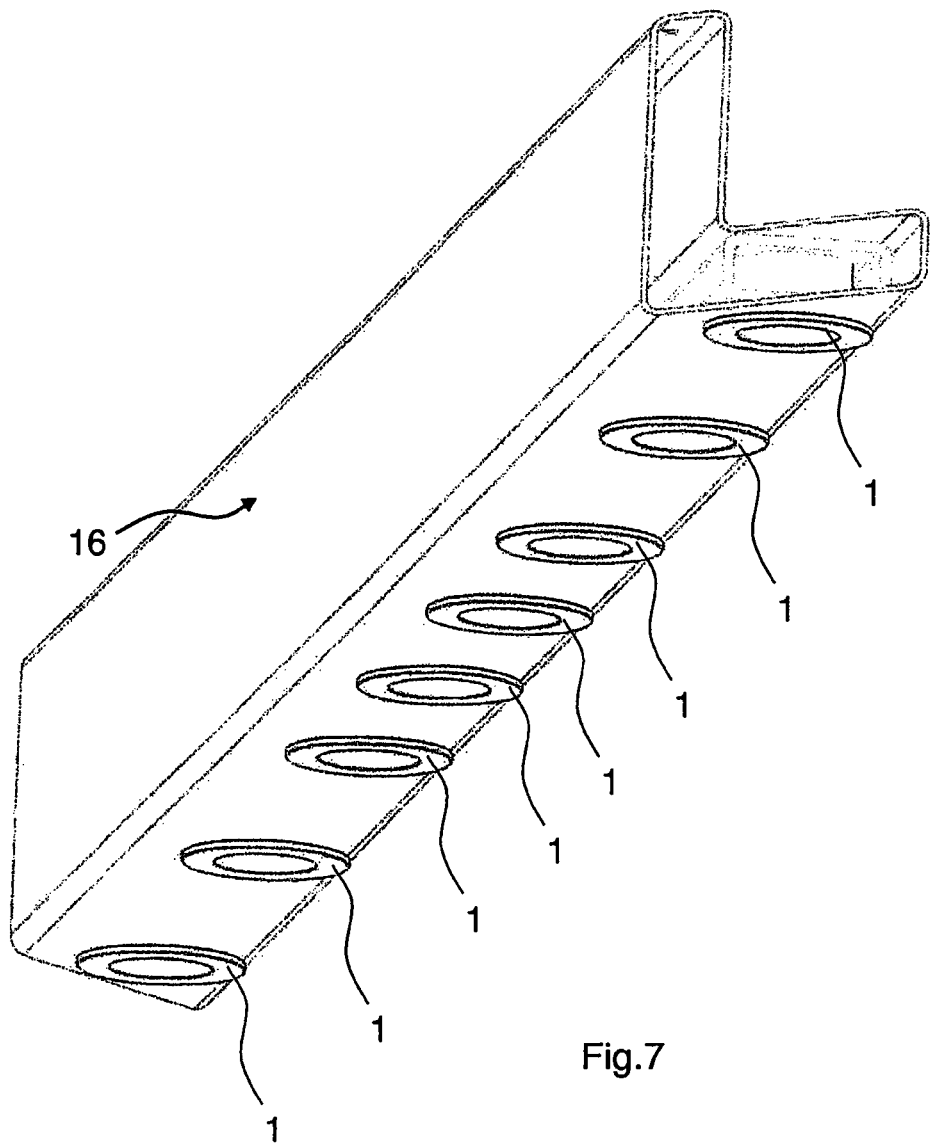

FIGS. 6 and 7 show a complete hollow profile 16 that forms, for example, part of a side frame of a battery box for an electric vehicle. The connecting elements 1 inserted into the hollow profile 16 are used to screw the hollow profile 16 to the vehicle frame of an electric vehicle (not shown here). In this context, it is particularly relevant that a battery box of an electric vehicle—as a wearing part—has to be detachably connected to the vehicle, which is why the connecting elements that are to be screwed are preferably configured as a screw sleeve or screw bushing.

FIG. 10 shows the attachment of the hollow profile 16 to another component 17 in the form of a vehicle body sill 34 by means of the hollow profile connection 27. Here, a fastening means in the form of a screw 32 affixes the connecting element 1, which is connected to the hollow profile 16, to a threaded bushing 35 of the vehicle body sill 34, so as to serve as a fastening means of the other component 17.

The holding force applied by the screwed connection between the screw 32 and the threaded bushing 35 is transmitted via a screw head 36 to the inner surface of the receiving space 8 of the connecting element 1 and is then introduced via the equidirectional contact surfaces 2, 3 into the hollow profile 16 which, in this manner, is secured to the vehicle body sill 34 as the other component 17.

The basic principle of the hollow profile connection shown here can also be viewed as a bayonet-type connection since the connection between the connecting element 1 and the hollow profile 16 is made by an approximately straight insertion of the connecting element 1 into the hollow profile 16, followed by a rotation of the connecting element 1 in a plane 20, 21, which is perpendicular to the insertion direction 33.

LIST OF REFERENCE NUMERALS 1 connecting element
2 contact surface
3 contact surface
4 circumferential section
5 positive-fit means
6 latching means
7 screw hole
8 receiving space
9 head section
10 collar
11 insertion bevel
12 means
13 sealing means
14 circumferential section
15 welded connection
16 hollow profile
17 another component
18 section (bottom)
19 section (top)
20 plane
21 plane
22 latching hook
23 connecting cutout
24 recess (bottom)
25 recess (top)
26 radial widened area
27 hollow profile connection
28 detent
29 sealing track
30 key surface
31 reinforcement element
32 screw
33 insertion direction
34 vehicle body sill
35 threaded bushing
36 screw head
$D_4$ diameter
$D_9$ diameter
$D_{10}$ diameter
$D_{24}$ diameter
$D_{25}$ diameter

The invention claimed is:

1. A connection between a hollow profile (16) and another component (17), comprising:
   a hollow profile (16) comprising opposing wall sections (18, 19), each wall section comprising at least one recess (24, 25); and
   a connecting element (1) comprising opposing contact surfaces (2, 3), and positive-fit means (5) adjacent to each of the opposing contact surfaces (2, 3);
   wherein the hollow profile is connected to another component (17) by inserting the connecting element (1) in the hollow profile (16) such that the contact surfaces (2, 3) and the positive-fit means (5) engage with opposing sides of the recesses (24, 25) in the wall sections (18, 19) by bayonetting.

2. The connection according to claim 1, wherein the at least two contact surfaces (2, 3) run in planes (20, 21) that are configured approximately parallel to each other.

3. The connection according to claim 1, wherein the positive-fit means (5) wraps around the hollow profile (16) in order to affix the connecting element (1) to a wall section (18, 19) of the hollow profile (16).

4. The connection according to claim 3, wherein each contact surface (2, 3) is associated with the positive-fit means (5) for establishing a positive-fit connection with the corresponding wall section (18, 19) of the hollow profile (16).

5. The connection according to claim 3, wherein the positive-fit means (5) comprises insertion aids on one side facing away from a corresponding contact surface (2, 3).

6. The connection according to claim 5, wherein the insertion aids are insertion bevels (11).

7. The connection according to claim 3, further comprising at least one latching means (6) on at least one contact surface (2, 3) in order to secure connection of the connecting element to the hollow profile (16).

8. The connection according to claim 7, wherein the at least one latching means (6) is at least one detent (28).

9. The connection according to claim 3, wherein the at least one positive fit means (5) is a latching hook (22).

10. The connection according to claim 1, further comprising sealing means (13) on at least one of the contact surfaces (2, 3) to create a sealing contact on a wall section (18, 19) of the hollow profile (16).

11. The connection according to claim 10, wherein the sealing means (13) are arranged on a circumferential sealing track (29).

12. The connection according to claim 1, further comprising a key placement surface (30), on the connecting element (1).

13. The connection according to claim 12, wherein the key placement surface is on a wall section that connects the contact surfaces (2, 3).

14. The connection according to claim 1, comprising:
wherein the recesses (24, 25) have different diameters (D24, D25); and further comprising
at least one connecting cutout (23) that passes through the at least two wall sections of the hollow profile;
wherein, in order to establish a connection between the hollow profile (16) and [a] the connecting element (1), at least one of the recesses (24, 25) of the hollow profile (16) has at least one radial widened area (26) so that the positive-fit means (5) of the connecting element (1) can be passed through.

15. The connection according to claim 14, wherein when the connecting element (1) is in [its] an installed state, the contact surfaces (2, 3) are in contact with corresponding wall sections (18, 19) of the hollow profile (16), and wherein the positive-fit means (5) of the connecting element (1) wrap around at least one of the wall sections (18, 19), so that part of the wall section (18, 19) comes to lie between the positive-fit means (5) and the contact surface (2, 3).

16. The connection according to claim 15, wherein when the connecting element (1) is in its installed state, the connecting element (1) is secured against rotating in a plane (20, 21) of one of the contact surfaces (2, 3), with a positive and/or frictional fit, and with an integrally bonded connection.

\* \* \* \* \*